United States Patent [19]

Firnig

[11] 3,711,852

[45] Jan. 16, 1973

[54] CONTACTFREE DATA INPUT DEVICE

[75] Inventor: Fritz Firnig, Weidengrund, Germany

[73] Assignee: Olumpia Werke AG, Wilhelshaven, Germany

[22] Filed: April 23, 1971

[21] Appl. No.: 136,907

[30] Foreign Application Priority Data

May 21, 1970 Germany....................P 20 24 679.1

[52] U.S. Cl.....................340/365 C, 178/18, 178/19, 307/88 ET

[51] Int. Cl...............................................H04q 3/00

[58] Field of Search..................340/365; 178/18, 19; 307/88 ET; 179/90 K; 340/365 C

[56] References Cited

UNITED STATES PATENTS

| | | | |
|---|---|---|---|
| 3,469,242 | 9/1969 | Eachus et al. | 340/365 X |
| 3,399,401 | 8/1968 | Ellis et al. | 178/18 |
| 3,523,161 | 8/1970 | Lewin | 340/365 |
| 3,293,640 | 12/1966 | Chalfin et al. | 340/365 |
| 2,997,703 | 8/1961 | Powell | 340/365 |

OTHER PUBLICATIONS

IBM Technical Disclosure Bulletin Vol. 12 No. 7 pp. 1053, 1054 Dec. 1969.

*Primary Examiner*—John W. Caldwell
*Assistant Examiner*—Robert J. Mooney
*Attorney*—Spencer & Kaye

[57] ABSTRACT

A contactfree data input device for an electronic calculator which is not limited by the finger size of the operator. The input device includes an input stylus having an element on the end thereof which will initiate an electrical input signal when it is brought into close proximity to a cooperating input circuit means located at a value input location in the input field. According to one embodiment an electret is provided on the stylus and the input circuit means comprises a pair of spaced electrodes. According to a further embodiment, the stylus is provided with a permanent magnet and the input circuit means comprises a ferrite core which is continuously being switched between its magnetization states and which has a separate readout winding.

1 Claim, 5 Drawing Figures

PATENTED JAN 16 1973 3,711,852

INVENTOR
Fritz Firnig

BY Spencer & Kaye

ATTORNEYS.

CONTACTFREE DATA INPUT DEVICE

BACKGROUND OF THE INVENTION

The present invention relates to a device for the contactfree manual input of data into electronic miniature data processing devices, particularly calculators.

The present trend of development in data processing devices is generally toward more extensive miniaturization which is made possible by modern structural components from the electronic art, e.g., the integrated circuit art and the MOS device art. As a result of these developments, the limits on input devices for manual data input are no longer given by the apparatus itself, but rather by the necessity for dependably being able to actuate the input elements with the fingers of the operator.

It is already known, see for example German Pat. No. 842,865, to provide a mechanical calculator device for addition and subtraction with a "calculating pen" which is utilized to move the number slide plates which are disposed in a confined space. In this device, the calculating pen is inserted into a tooth gap of the number slide plate and then moved until it reaches an abutment. Such an arrangement is of course not suited for electronic input devices and obviously permits only a very slow data input.

In order to meet the requirements of modern electronic data processing instruments, capacitive input elements have been developed in which a contactfree input of data is possible without any mechanically moving components simply by the touch of a finger on the input components (German Published Pat. Application No. 1,297,183). Although the desired input speed can be obtained with this arrangement, miniaturization of the input field is again limited by the area required for the fingers.

SUMMARY OF THE INVENTION

It is the object of the present invention to provide a device for manual data input into electronic data processing devices which permits contactfree actuation of electrical signals corresponding to the data and which is not limited in its dimensions by the area required for finger actuation. This is accomplished according to the present invention in that an input stylus is provided which bears an element which, in co-operation with an input circuit means, initiates the emission of an electric signal when it approaches the value input location of an input field.

The advantages obtained with the present invention consist particularly in that it is now possible to produce the smallest possible data processing devices which are designed, for example, as pocket instruments, and which can be carried to various locations without any difficulties. The use of such devices is thus possible, for example, at construction sites, during traveling or for inventory-taking in a warehouse. Moreover, the entry of a value input merely by the approach of the stylus to the calculator can be done very quickly and dependably and can be realized with different means.

According to one specific embodiment of the invention, the end of an input stylus is provided with an electret and each value input location in the input field is provided with a pair of spaced electrodes. Alternatively, of course, the stylus may be provided with an electrode connected to the calculator via a wire and each value input location provided with the second electrode and the electret. This embodiment of the invention has the particular advantage that a device so designed is independent of any supply voltage, i.e., no separate energization of the input circuitry is required.

According to a further embodiment of the invention the input stylus is provided with an electrode and each value input location in the input field is provided with a pair of spaced capacitively coupled electrodes which are connected to a voltage supply. In this embodiment the signal generation is done capacitively in that the capacitance is changed by the insertion of the input stylus between the two electrodes.

BRIEF DESCRIPTION OF THE DRAWINGS

FIG. 3 illustrates an input arrangement according to another embodiment of the invention with the value input location shown in section.

FIG. 4 illustrates a further embodiment of the invention utilizing a capacitively acting value input location.

FIG. 5 illustrates another embodiment of the invention utilizing a value input location with an annular ferrite core.

DESCRIPTION OF THE PREFERRED EMBODIMENTS

Figure 1:
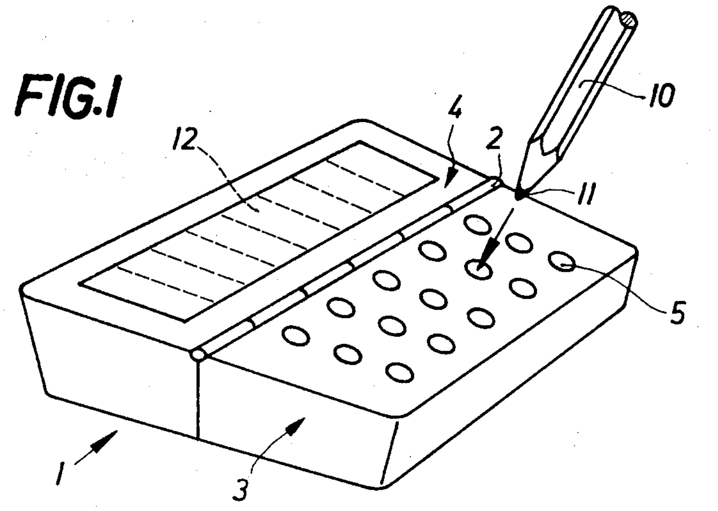
FIG. 1 illustrates a miniature calculator having a data input arrangement according to the invention.

Referring now to FIG. 1, there is shown a miniature calculator 1 of the so-called pocket type which can be folded about a joint 2 and can be placed in a pocket in the manner of a notebook. The calculator 1 is divided into an input portion 3 and an indicator portion 4. The input field of the input portion 3 is provided with a plurality of value input locations 5 each of which is provided with an input circuit which upon the initiation of a signal therein will cause a predetermined associated input value to be entered in the calculator. According to the invention, this input signal is initiated by means of a stylus 10 in various manners and depending on the construction of the input circuit at the input value location 5.

Figure 2:
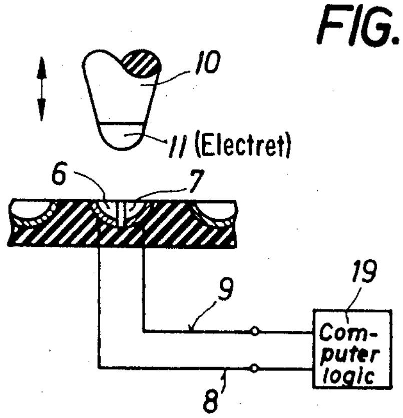
FIG. 2 illustrates an input arrangement according to one embodiment of the invention with a value input location shown in section.
Figure 2:
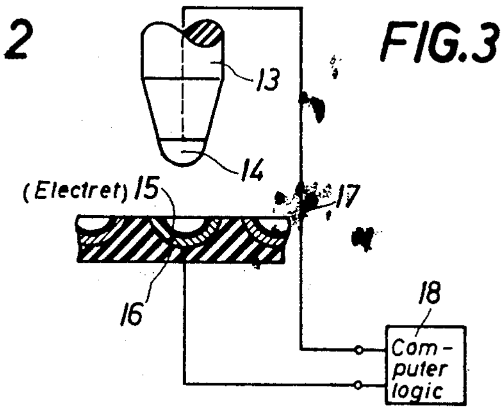
Figure 2:
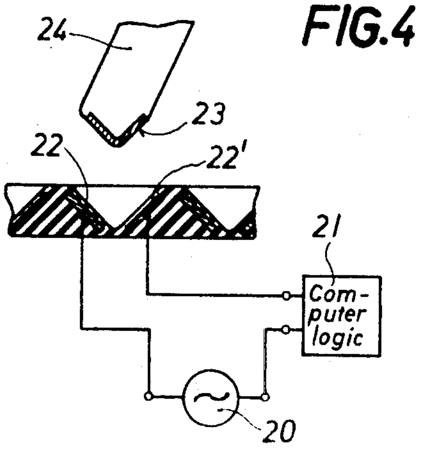
Figure 2:
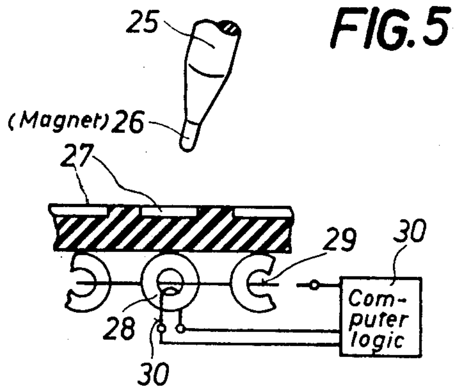

According to one embodiment of the invention as shown in FIG. 2, the input circuit at each value input location 5 consists of a pair of spaced electrodes 6,7 which are connected, by means of lines or wires 8,9 respectively to the computer logic 19 which is preferably high-ohmic and accomodated in the housing of calculator 1, the logic preferably being of the kind provided in the MOS art. The tip of the input stylus 10 is provided with an electret 11. When the electret 11 is brought in close proximity to the electrodes 6,7, it will initiate an electric signal in the input circuit 6–9. The display of the values entered and/or of the result of a calculation occurs in the display window 12.

According to the embodiment shown in FIG. 3, instead of having an electret at its tip, the stylus 13 is provided with an electrode 14 at its tip, and the electret 15 and an underlying further electrode 16 are disposed at each value input location 5 in the input field. In contradistinction to the embodiment shown in FIG. 2, the stylus 13 and in particular the electrode 14 on the tip thereof, are now connected to the computer logic 18 via a conductive connection 17. Other than the physical arrangement of the two electrodes and the electret, this embodiment operates in the same manner as that of FIG. 2. It is of course just as conceivable — but not shown — to accommodate one electrode and the electret in the stylus and the second electrode in each value input location of the input field.

FIG. 4 shows another arrangement according to the invention for the input of data which, in contradistinction to the embodiments of FIGS. 2 and 3 utilizing electrets, is dependent on a voltage supply. This voltage supply is, for example, an alternating voltage source 20 which is connected to the input circuit element consisting of two spaced planar electrodes 22,22' which act as a capacitor. A third electrode 23 is disposed at the tip of input stylus 24 and effects a change in the capacitance when it enters into the air space between electrodes 22 and 22', thus initiating a signal which is detectable by the computer logic 21. It is, of course, possible to modify this embodiment so that the electrode 23 of the input stylus 24 is connected to the evaluation portion of the calculator or computer logic circuitry 21 by means of a conductive connection.

Finally, FIG. 5 shows an embodiment of the invention wherein at each input value location the signal is emitted via an annular ferrite core 28. The tip of the stylus 25 is provided with a permanent magnet 26 which, upon approaching a particular input value location 27 of the input field, influences the associated annular core 28. All of the magnetic cores 28 are excited with an alternating current of high frequency via driver coil 29, which is common to all of the cores 28 , which causes the cores to flip back and forth between their magnetic extreme positions. This flipping of the cores 28 induces a voltage in the reading coils 30, one of which is provided for each core 28. The approach of the permanent magnet 26 thus brings about the result that the affected annular core is no longer flipped by the current in coil 29, thus initiating a change in the signal occurring in the associated reading coil which is detected by the logic circuitry 30.

Other embodiments based on the same principle of the present invention can also be produced, for example, with magnetic field dependent components, field plates or Hall generators. It is also possible within the scope of the invention to provide a lamp in the input stylus and to arrange light-sensitive elements at the various input value locations in the input field.

It will be understood that the above description of the present invention is susceptible to various modifications, changes and adaptations, and the same are intended to be comprehended within the meaning and range of equivalents of the appended claims.

I claim:

1. Apparatus for the manual contactfree input of data into a miniature electronic data processing device comprising in combination:

an input field for the data processing device having a plurality of discrete input locations each of which is associated with a different input value;

an input circuit at each of said input locations including a pair of spaced electrodes;

signal evaluating means;

means directly connecting each said electrode to said signal evaluating means;

an input stylus; and an electret located on the tip of said stylus for initiating an electrical signal in one of said input circuits when the tip of said stylus is brought in close proximity to the input circuit associated with said one of of said input locations.

* * * * *